United States Patent
Chang

(10) Patent No.: US 6,191,498 B1
(45) Date of Patent: Feb. 20, 2001

(54) POWER-SUPPLYING DEVICE FOR GENERATING DIFFERENT VOLTAGE OUTPUTS

(75) Inventor: David Chang, Taipei (TW)

(73) Assignee: Pacific Technology Co., Ltd., Taipei (JP)

( * ) Notice: Under 35 U.S.C. 154(b), the term of this patent shall be extended for 0 days.

(21) Appl. No.: 09/401,607

(22) Filed: Sep. 22, 1999

(30) Foreign Application Priority Data

Jul. 19, 1999 (TW) .................................. 88212094

(51) Int. Cl.[7] .......................................... H02J 1/00
(52) U.S. Cl. .................................. 307/11; 307/80
(58) Field of Search .............................. 307/11, 150, 28, 307/75, 80, 43, 47, 52, 45

(56) References Cited

U.S. PATENT DOCUMENTS

| | | | |
|---|---|---|---|
| 4,209,710 | * 6/1980 | Quarton | 307/66 |
| 5,592,030 | * 1/1997 | Adahan | 307/80 |
| 5,652,499 | * 7/1997 | Morita et al. | 320/6 |
| 5,708,351 | * 1/1998 | Takamoro | 320/3 |
| 5,715,156 | * 2/1998 | Yilmaz et al. | 363/142 |
| 5,804,894 | * 9/1998 | Leeson et al. | 307/130 |
| 5,929,597 | * 7/1999 | Pfeifer et al. | 320/107 |

* cited by examiner

Primary Examiner—Albert W. Paladini
Assistant Examiner—Robert L. Deberadinis
(74) Attorney, Agent, or Firm—Baker Botts L.L.P.

(57) ABSTRACT

A power-supplying device is adapted to generate different voltage outputs, and includes an input power providing unit for providing an input power signal, a selector unit operable so as to generate a voltage select signal corresponding to a selected one of the voltage outputs, a processor unit connected to the selector unit so as to receive the voltage select signal therefrom and so as to generate a converter control signal corresponding to the voltage select signal, and an adjustable dc-to-dc converter connected to the input power providing unit and the processor unit so as to receive the input power signal and the converter control signal respectively therefrom. The converter is controlled by the converter control signal so as to process the input power signal in order to generate the selected one of the voltage outputs.

2 Claims, 1 Drawing Sheet

POWER-SUPPLYING DEVICE FOR GENERATING DIFFERENT VOLTAGE OUTPUTS

BACKGROUND OF THE INVENTION

1. Field of the Invention

The invention relates to a power-supplying device, more particularly to a power-supplying device that can convert input power into different voltage outputs.

2. Description of the Related Art

Conventional electrical appliances, such as digital cameras, motion video recorders, mobile telephones and portable computers, use battery packs as a source of electrical power. To use electrical appliances having different specifications of voltage inputs, different battery packs for providing the voltage inputs must be prepared, thereby resulting in inconvenience and increased costs.

SUMMARY OF THE INVENTION

Therefore, the object of the present invention is to provide a power-supplying device that can convert direct current input power into different voltage outputs.

According to the present invention, a power-supplying device is adapted to generate different voltage outputs, and includes an input power providing unit for providing an input power signal, a selector unit operable so as to generate a voltage select signal corresponding to a selected one of the voltage outputs, a processor unit connected to the selector unit so as to receive the voltage select signal therefrom and so as to generate a converter control signal corresponding to the voltage select signal, and an adjustable dc-to-dc converter connected to the input power providing unit and the processor unit so as to receive the input power signal and the converter control signal respectively therefrom. The converter is controlled by the converter control signal so as to process the input power signal in order to generate the selected one of the voltage outputs.

BRIEF DESCRIPTION OF THE DRAWING

Other features and advantages of the present invention will become apparent in the following detailed description of the preferred embodiment with reference to the accompanying drawing, of which.

DETAILED DESCRIPTION OF THE PREFERRED EMBODIMENT

Figure 1:
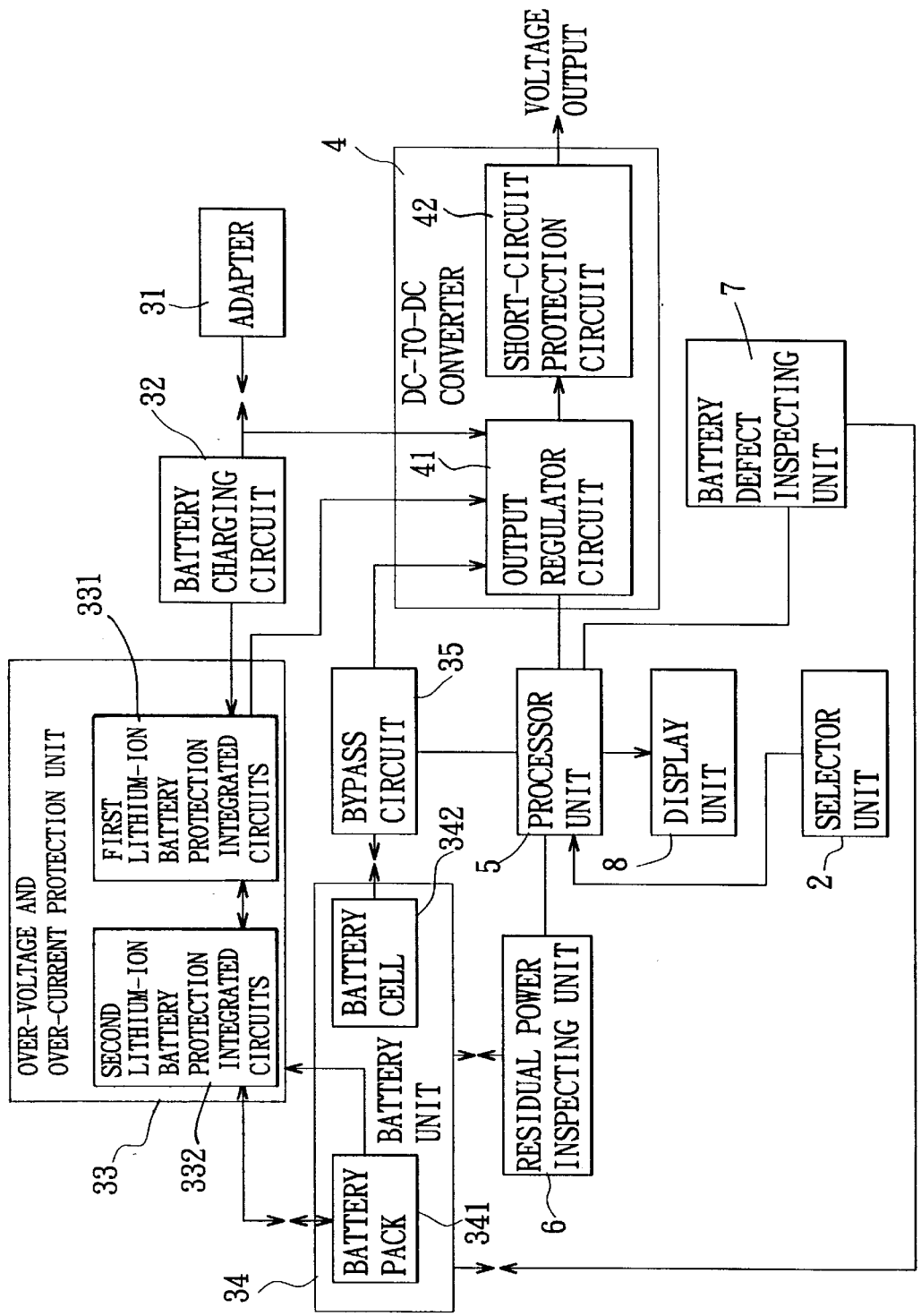
FIG. 1 is a schematic circuit block diagram illustrating the preferred embodiment of a power-supplying device according to the present invention.

Referring to FIG. 1, according to the preferred embodiment of the present invention, a power-supplying device is adapted to generate different voltage outputs, and is shown to include an input power providing unit, a selector unit 2, a processor unit 5 and an adjustable dc-to-dc converter 4.

The input power providing unit provides an input power signal.

The selector unit 2, such as select switches, is operable so as to generate a voltage select signal corresponding to a selected one of the voltage outputs.

The processor unit 5 is connected to the selector unit 2 so as to receive the voltage select signal therefrom and so as to generate a set of converter control signals corresponding to the voltage select signal in accordance with the contents of a pre-programmed built-in memory (not shown) thereof.

The converter 4 includes a known adjustable output regulator circuit 41 and a short-circuit protection circuit 42. The output regulator circuit 41 is connected to the input power providing unit and the processor unit 5 so as to receive the input power signal and the converter control signals respectively therefrom. The output regulator circuit 41 is controlled by the converter control signals so as to process the input power signal in order to generate the selected one of the voltage outputs. The short-circuit protection circuit 42 is connected to the output regulator circuit 41, and serves to break electrical connection between the output regulator circuit 41 and an electrical appliance (not shown) that receives the selected one of the voltage outputs upon detection of a short-circuit condition.

The input power providing unit includes an adapter 31, a battery charging circuit 32, and a battery unit 34 which can consist of a rechargeable battery pack 341 and a dry battery cell 342.

In a first condition, the adapter 31 is connected to the converter 4, and converts an alternating current power input into a direct current power input that serves as the input power signal.

In a second condition, the adapter 31 is connected to the converter 4 and the battery charging circuit 32, and the battery pack 341 is connected to the battery charging circuit 32. An over-voltage and over current protection unit 33, which consists of first and second lithium-ion battery protection integrated circuits, 331, 332 such as IC MM1451 and IC MM1293 available from Mitsumi of Japan, interconnects the battery charging circuit 32 and the battery pack 341. The protection unit 33 breaks electrical connection between the battery charging circuit 32 and the battery pack 341 upon detection of one of over-voltage and over-current conditions when the battery pack 341 is charged by the battery charging circuit 32. Since the construction of the battery charging circuit 32 is not critical to this invention, a detailed description of the same will be obviated herein for the sake of brevity.

In a third condition, when the adapter 31 is disconnected from the output regulator circuit 41 of the converter 4 and the battery charging circuit 32, while the battery pack 341 remains connected to the protection unit 33, the protection unit 33 interconnects the battery pack 341 and the output regulator circuit 41 such that the input power signal is supplied by the battery pack 341. The protection unit 33 breaks electrical connection between the battery charging circuit 32 and the battery pack 341 upon detection of one of over-voltage and over-current conditions when the battery pack 341 supplies the input power signal.

In a fourth condition, only the dry battery cell 342 is in use and serves as the source of the input power signal. A bypass circuit 35 is connected to the dry battery cell 342, the processor unit 5 and the output regulator circuit 41 of the converter 4. The bypass circuit 35 is controlled by the processor unit 5 to make or break electrical connection between the dry battery cell 342 and the output regulator circuit 41 according to a battery select signal received by the processor unit 5 from the selector unit 2.

The power-supplying device further includes a residual power inspecting unit 6 interconnecting the battery unit 34 and the processor unit 5 to generate residual power information to the processor unit 5, a battery defect inspecting unit 7 interconnecting the battery unit 34 and the processor unit 5 to generate battery defect information to the processor unit 5, and display unit 8 connected to and controlled by the processor unit 5 to display the residual power information and the battery defect information thereon.

It has thus shown that the power-supplying device of this invention is capable of generating different voltage outputs, and to charge a rechargeable battery pack while simultaneously generating a voltage output. By using more than one dc-to-dc converter under the control of the processor unit, more than one voltage output can be generated by the power-supplying device of this invention at the same time.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A power-supplying device adapted to generate different voltage outputs, comprising:

an input power providing unit for providing an input power signal;

a selector unit operable so as to generate a voltage select signal corresponding to a selected one of the voltage outputs;

a processor unit connected to said selector unit so as to receive the voltage select signal therefrom and so as to generate a converter control signal corresponding to the voltage select signal;

an over-voltage and over-current protection unit interconnecting a battery charging circuit and a rechargeable battery pack, said protection unit breaking electrical connection between said battery charging circuit and said battery pack upon detection of one of over-voltage and over-current conditions when said battery pack is charged by said battery charging circuit; and an adjustable dc-to-dc converter connected to said input power providing unit and said processor unit so as to receive the input power signal and the converter control signal respectively therefrom, said converter being controlled by the converter control signal so as to process the input power signal in order to generate the selected one of the voltage outputs;

wherein said input power providing unit includes an adapter for converting an alternating current power input into a direct current power input that serves as the input power signal;

wherein said input power providing unit further includes said battery charging circuit connected to said adapter, and said battery pack connected to said battery charging circuit; and wherein said protection unit is further connected to said converter, said protection unit interconnecting said battery pack and said converter such that said input power signal is supplied by said battery pack when said adapter is disconnected from said converter and said battery charging circuit, said protection unit breaking electrical connection between said battery pack and said converter upon detection of an over-discharge condition when the input power signal is supplied by said battery pack.

2. The power-supplying device as claimed in claim 1, further comprising a bypass circuit connected to said battery pack, said processor unit and said converter, said bypass circuit being controlled by said processor unit to make or break electrical connection between said battery pack and said converter.

* * * * *